(12) United States Patent
Isobe (10) Patent No.: US 8,646,962 B2
(45) Date of Patent: Feb. 11, 2014

(54) LIGHT GUIDING PLATE, LIGHTING APPARATUS, AND DISPLAY APPARATUS

(75) Inventor: Hiroaki Isobe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/581,764

(22) PCT Filed: Jan. 14, 2011

(86) PCT No.: PCT/JP2011/050517
§ 371 (c)(1),
(2), (4) Date: Aug. 29, 2012

(87) PCT Pub. No.: WO2011/108294
PCT Pub. Date: Sep. 9, 2011

(65) Prior Publication Data
US 2012/0327684 A1    Dec. 27, 2012

(30) Foreign Application Priority Data
Mar. 1, 2010 (JP) ................... 2010-043874

(51) Int. Cl.
*F21V 8/00* (2006.01)
(52) U.S. Cl.
USPC ......................... 362/621; 362/602
(58) Field of Classification Search
USPC .................. 362/602, 608, 621, 624
See application file for complete search history.

(56) References Cited

U.S. PATENT DOCUMENTS

2007/0139967 A1* 6/2007 Peng ............................ 362/617
2010/0282835 A1   11/2010 Wakamoto et al.

FOREIGN PATENT DOCUMENTS

| JP | 49-17964 Y1 | 5/1974 |
| JP | 2000-106053 A | 4/2000 |
| JP | 2001-228812 A | 8/2001 |
| WO | 2009/028205 A1 | 3/2009 |

OTHER PUBLICATIONS

International Search Report (ISR) issued in PCT/JP2011/050517 mailed in Apr. 2011.

* cited by examiner

Primary Examiner — David V Bruce
(74) Attorney, Agent, or Firm — Chen Yoshimura LLP (57) ABSTRACT

Provided is a light guide plate that is suited for a compact illumination device emitting high-grade light and that allows the orientation thereof to be recognized with ease, an illumination device equipped with the light guide plate, and a display device equipped with the illumination device. Two protrusions (12A, 12B) are formed on a light-receiving face (11r) of a light guide plate (11), and these protrusions (12A, 12B) serve as a recognition member that allows the orientation of a top surface (11u) of the light guide plate (11) to be recognized.

8 Claims, 11 Drawing Sheets

LIGHT GUIDING PLATE, LIGHTING APPARATUS, AND DISPLAY APPARATUS

TECHNICAL FIELD

The present invention relates to a light guide plate that guides received light to the outside, an illumination device equipped with the light guide plate, and a display device equipped with the illumination device.

BACKGROUND ART

A display device equipped with a display panel, such as a liquid crystal display device equipped with a non-light-emitting liquid crystal display panel, is typically provided with an illumination device, which is a backlight unit in this case, for supplying light to the liquid crystal display panel. Such a backlight unit is equipped with a light guide plate that converts light to planar light so as to produce planar light that corresponds to the liquid crystal display panel having a planar shape.

Figure 10:
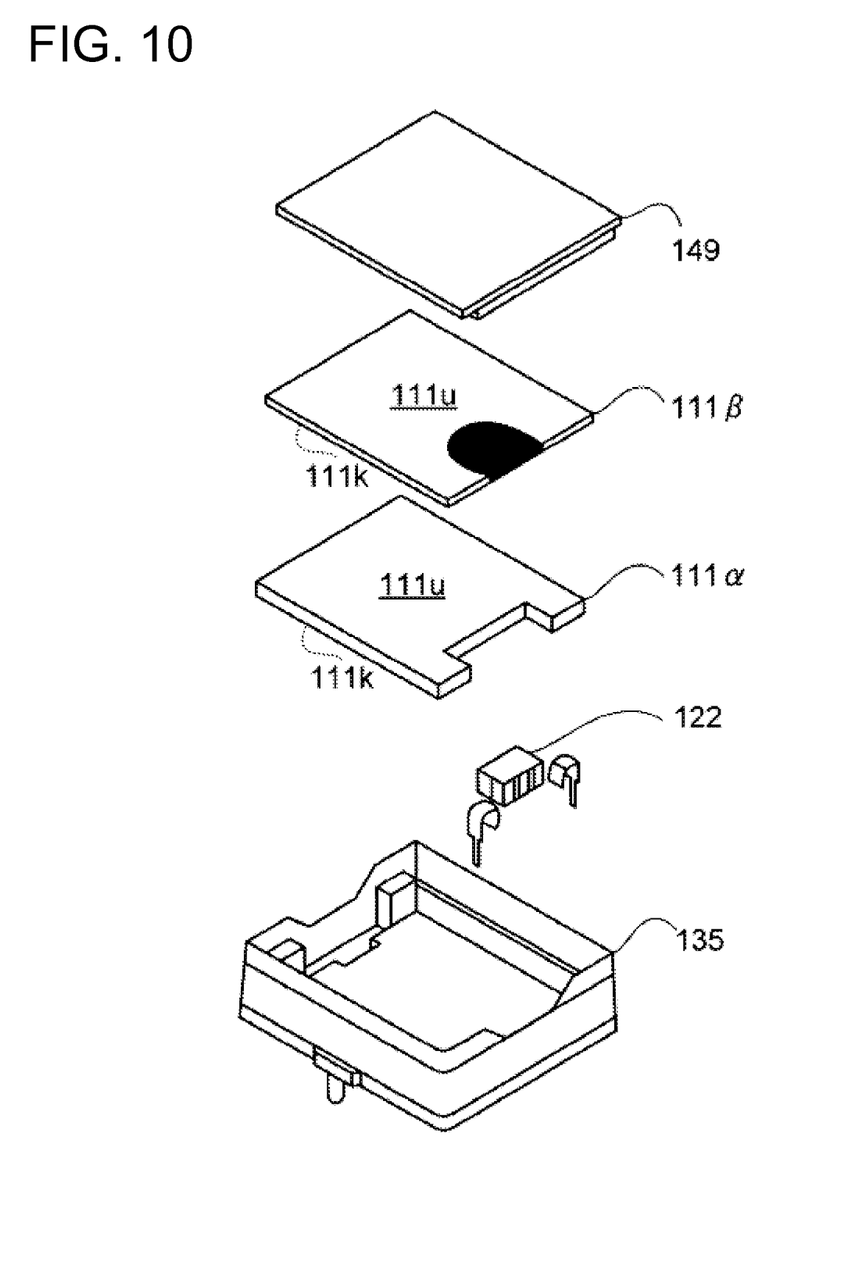
FIG. 10 is an exploded perspective view of a conventional liquid crystal display device.

As shown in FIG. 10, a backlight unit described in Patent Document 1, for example, includes light guide plates 111 (111α, 111β) that receive light from a light emitting diode (LED) 122 and that convert the light to planar light by internal multiple reflection. The light travelling from these light guide plates 111α and 111β enters a liquid crystal display panel 149 having a planar shape. The member indicated by the reference character 135 is a backlight chassis 135 that houses the light guide plates 111α and 111β.

RELATED ART DOCUMENT

Patent Document

Patent Document 1: Japanese Patent Application Laid-Open Publication No. 2000-106053

SUMMARY OF THE INVENTION

Problems to be Solved by the Invention

The light guide plates 111 are formed of a transparent resin, and therefore, it is difficult to make a distinction between a top surface 111*u* and a bottom surface 111*k* (surface opposite to the top surface 111*u*) in the light guide plates 111α and 111β. To address this issue, a technique to recognize the orientation (front and back) of the light guide plates 111 has been devised.

Figure 11:
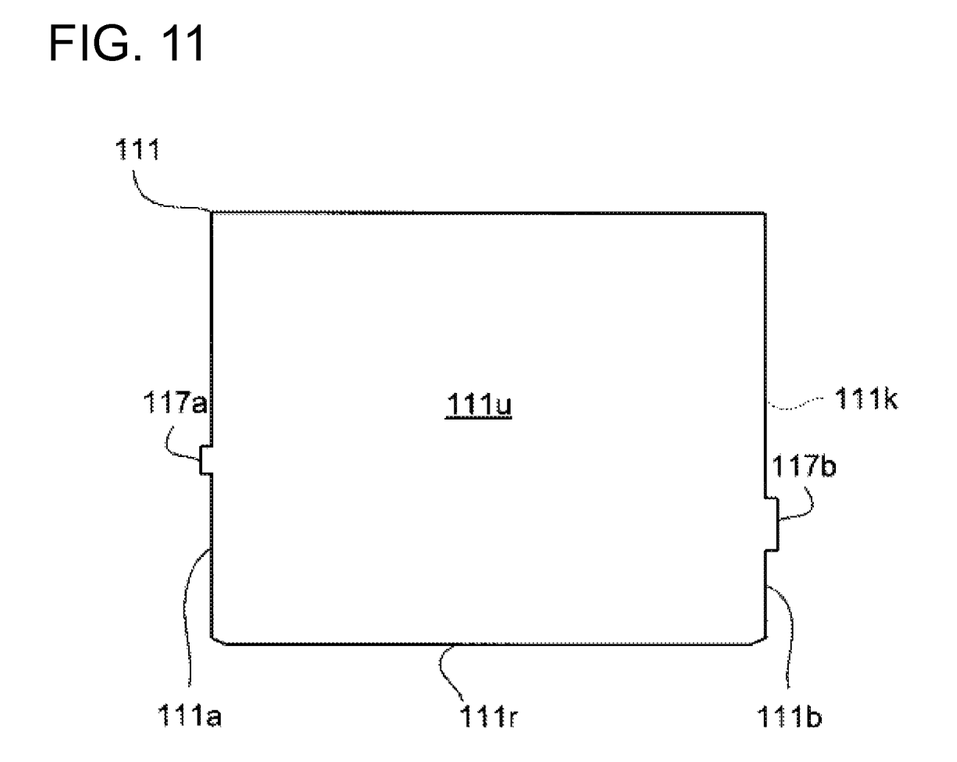
FIG. 11 is a plan view of a conventional light guide plate.

As shown in FIG. 11, for example, in two side surfaces 111*a* and 111*b* that are opposite to each other in the light guide plate 111, a tab 117*a* and a tab 117*b* are respectively formed on the side surface 111*a* and on the side surface 111*b*, and by the positional difference between the tab 117*a* and the tab 117*b*, the orientation of the light guide plate 111 can be recognized.

However, because these tabs 117*a* and 117*b* are located remote from a light-receiving face 111*r* (side surface facing the LED 122) in the light guide plate 111, incident light reaches these tabs through the light-receiving face 111*r*, and because the light entering the tabs 117*a* and 117*b* does not travel in the desired direction, the quality of planar light is degraded. This results in planar light having uneven light intensity, for example.

Also, because the light guide plate 111 has the tabs 117*a* and 117*b* respectively formed on the two opposite side surfaces 111*a* and 111*b* thereof, the outer shape of a backlight unit is made larger for the size of these tabs 117*a* and 117*b*.

The present invention was made in view of the above-mentioned circumstances, and a main object thereof is to provide a light guide plate that can be suitably used for a compact illumination device emitting high quality light and that allows the orientation thereof to be recognized with ease, an illumination device equipped with the light guide plate, and a display device equipped with the illumination device.

Means for Solving the Problems

According to the present invention, a light guide plate that receives light at a light-receiving face thereof and that emits the received light from a top surface thereof includes at least two protrusions formed on the light-receiving face, and the protrusions serve as a recognition member that helps the orientation of the top surface to be recognized.

With this configuration, it becomes possible to recognize the orientation of the top face of the light guide plate with ease by visually checking the protrusions. Because a plurality of protrusions are formed only on a single surface, which is the light-receiving face, the outer shape of the light guide plate can be made smaller than the outer shape of a light guide plate having protrusions on two side surfaces, respectively, for example. This makes it possible to reduce the size of an illumination device equipped with this light guide plate. When light enters through the light-receiving face between the protrusions, the light is not likely to reach these protrusions, and therefore, light emitted through the top surface of the light guide plate does not have uneven light intensity resulting from the protrusions.

In the light guide plate having the above-mentioned configuration, it is preferable that the two protrusions have mutually different shapes. This makes it even easier to recognize the orientation of the top surface of the light guide plate.

The light guide plate having the above-mentioned configuration may also be configured such that the two protrusions are formed at two ends of the light-receiving face in the longitudinal direction, the center of the shortest distance between the two protrusions is offset from the center of the light-receiving face in the longitudinal direction, and by this offset, the orientation of the top surface of the light guide plate is recognized. In this case, the two protrusions may have the same shape, or may have mutually different shapes.

In the light guide plate having the above-mentioned configuration, it is preferable that the two protrusions have a portion that is flush with one of three surfaces of the top surface, a bottom surface that is opposite to the top surface, and a side surface between the top surface and the bottom surface. This makes it possible to simplify the structure of a mold used for forming the light guide plate, thereby keeping the mold cost low.

The present invention also includes an illumination device equipped with the light guide plate, a light source that supplies light to a light-receiving face thereof, and a chassis that houses these light guide plate and light source.

In the illumination device having the above-mentioned configuration, it is preferable that the chassis have a side wall along a protruding direction of the protrusion of the light guide plate, and when the shortest distance between the side wall and the light source closest thereto is defined as IL, and the longest distance between the protrusion and an end of the light-receiving face closest thereto is defined as LD in the longitudinal direction of the light-receiving face, which is a direction intersecting with the protruding direction, it is preferable that the longest distance LD be shorter than the shortest distance IL. This way, the protrusions and the light sources are housed in the chassis without making contact with each other.

The present invention also includes a display device equipped with the illumination device and a display panel that receives light from the illumination device.

Effects of the Invention

According to the present invention, the orientation of the top surface of a light guide plate can be recognized by a plurality of protrusions formed on a light-receiving face, which is one surface of the light guide plate. The outer shape of such a light guide plate, which has the protrusions formed only on the light-receiving face, is made smaller than the outer shape of a light guide plate having protrusions respectively formed on two opposite side surfaces, for example. Further, light entering through the light-receiving face between the protrusions is not likely to reach the protrusions. Therefore, it becomes possible to prevent the occurrence of the uneven light intensity resulting from the protrusions, thereby preventing the degradation of planar light emitted from the light guide plate.

DETAILED DESCRIPTION OF EMBODIMENTS

An embodiment of the present invention will be described below with reference to figures. Reference characters for components and the like may be omitted for convenience, and in such a case, other figures are to be referred to. Hatching may be used for areas other than a cross section. A black dot accompanying an arrow indicates a direction perpendicular to the plane of the sheet of paper. A white block arrow indicates a movement of components.

Figure 1:
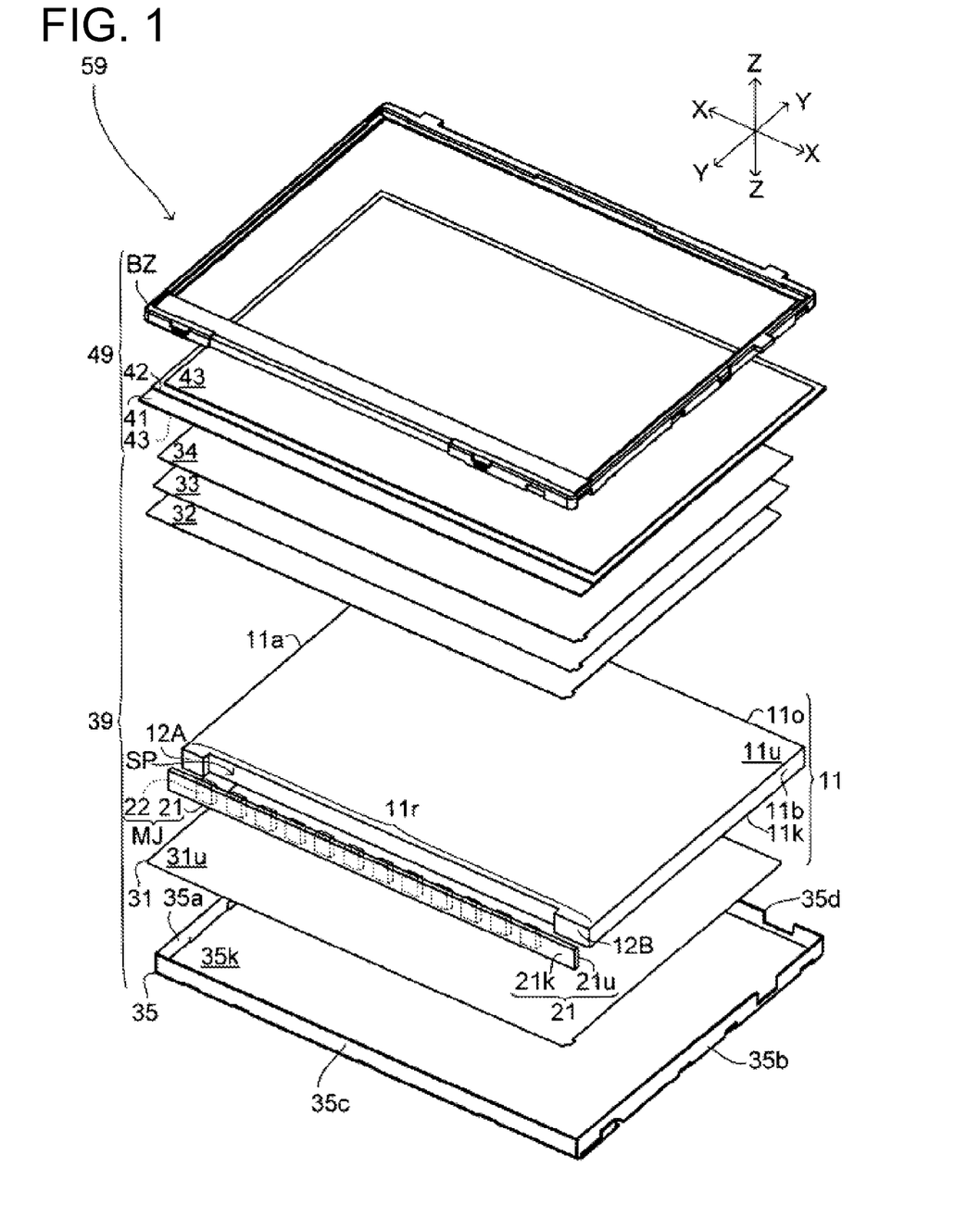
FIG. 1 is an exploded perspective view of a liquid crystal display device.

FIG. 1 is an exploded perspective view showing a liquid crystal display device 59. As shown in FIG. 1, the liquid crystal display device 59 includes a liquid crystal display panel 49, which is a display panel, and a backlight unit 39, which is an illumination device that supplies light to the liquid crystal display panel 49. The liquid crystal display panel 49 is enclosed by a bezel BZ.

In the liquid crystal display panel 49, an active matrix substrate 41 including switching elements such as thin film transistors (TFTs) and an opposite substrate 42 facing this active matrix substrate 41 are bonded to each other by a sealing material (not shown), and a gap between the two substrates 41 and 42 is filled with liquid crystals (not shown).

Polarizing films 43 are attached to a light-receiving face of the active matrix substrate 41 and to a light emerging side of the opposite substrate 42, respectively. The liquid crystal display panel 49 configured in the manner described above displays an image by utilizing a change in the transmittance resulting from the tilting of liquid crystal molecules.

Next, a backlight unit 39 that is located directly below the liquid crystal display panel 49 will be explained. The backlight unit 39 includes an LED module MJ, a light guide plate 11, a reflective sheet 31, a diffusion plate 32, a prism sheet 33, a lens sheet 34, and a backlight chassis 35.

The LED module MJ, which is a module that emits light, includes a mounting substrate 21 and light emitting diodes (LEDs) 22 mounted on the substrate surface of the mounting substrate 21.

The mounting substrate 21 is formed in a rectangular shape, and has a plurality of electrodes (not shown) arranged on a mounting surface 21U thereof. The LEDs 22 are mounted onto these electrodes.

The LEDs 22, which are light-emitting elements constituting point light sources, are mounted on the electrodes of the mounting substrate 21, and are provided with electric current, thereby emitting light. In order to secure the sufficient light intensity of the LED module MJ, a plurality of LEDs 22 are arranged along the longitudinal direction of the mounting substrate 21. A direction in which the plurality of LEDs 22 are arranged is defined as a direction X, a direction that intersects with the direction X at a right angle, in which light from the LEDs 22 travels, is defined as a direction Y, and a direction that intersects with the direction X and with the direction Y at a right angle is defined as a direction Z.

The light guide plate 11 is made of a transparent resin plate, and has a side surface 11r, which is the light receiving face, facing the light-emitting side of the LED module MJ, thereby receiving light emitted from the LEDs 22. In the light guide plate 11, the received light undergoes internal multiple reflection, and is emitted through the top surface 11u as planar light. The shape of the light guide plate 11 will be explained in detail below.

The reflective sheet 31 is covered by a bottom surface 11k that is a surface opposite to the top surface 11u of the light guide plate 11. A reflective surface 31U of the reflective sheet 31 faces the bottom surface 11k of the light guide plate 11, and reflects light leaking from the bottom surface 11k back to the light guide plate 11, thereby preventing the light loss.

The diffusion plate 32 is an optical sheet that overlaps the top surface 11u of the light guide plate 11, and diffuses light emitted from the light guide plate 11. The diffusion plate 32 that overlaps the light guide plate 11 diffuses planar light from the light guide plate 11 so as to distribute the light over the entire liquid crystal display panel 49.

The prism sheet 33 is an optical sheet that overlaps the diffusion plate 32. The prism sheet 33 has a plurality of prisms that extend linearly in one direction and that have a triangle cross-section, for example, and the plurality of prisms are arranged so as to cross the one direction on the surface of the sheet. With this configuration, the prism sheet 33 polarizes the radiation characteristics of the light from the diffusion plate 32.

The lens sheet 34 is an optical sheet that overlaps the prism sheet 33. In the lens sheet 34, particles that refract and scatter light are dispersed. The lens sheet 34 prevents the light from the prism sheet 33 from being concentrated in localized areas, thereby suppressing a contrast between light and dark areas, i.e., uneven light intensity.

A backlight chassis 35 is formed in a box shape so as to house objects therein, and houses the LED module MJ, the light guide plate 11, the light diffusion plate 32, the prism sheet 33, and the lens sheet 34.

The backlight unit 39 configured in the above-mentioned manner converts light emitted from the LED module MJ to planar light by the light guide plate 11, and supplies the planar light to the liquid crystal display panel 49 through the plurality of optical members, which are the diffusion plate 32, the prism sheet 33, and the lens sheet 34. The liquid crystal display panel 49 that does not emit light by itself receives light (backlight) from the backlight unit 39 in this manner, thereby improving the display function thereof.

Figure 2:
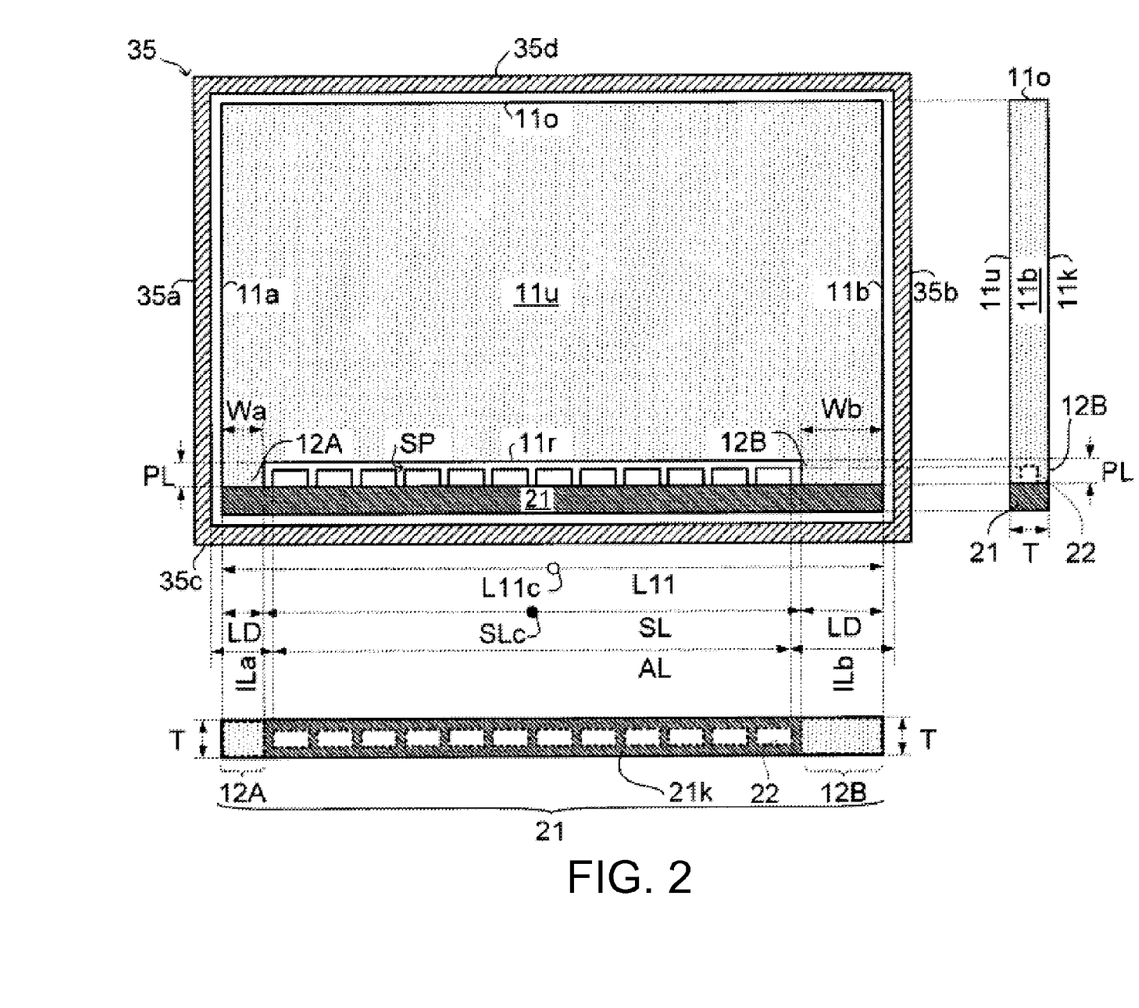
FIG. 2 is a figure showing a plan view shape, a front view shape, and a side view shape of a backlight unit.

The shape of the light guide plate 11 is explained in detail with reference to FIGS. 1 and 2. FIG. 2 shows a trihedral figure illustrating the light guide plate 11 viewed from three different directions. The first view in FIG. 2 is a plan view of the light guide plate 11, the LED module MJ, and the backlight chassis 35, which have been assembled. The second view in FIG. 2 is a front view of the LED module MJ viewed from the rear surface side, i.e., the side of the rear surface 21k, which is a surface opposite to the mounting surface 21u. The backlight chassis 35 is omitted in this view. The third view in FIG. 2 is a side view of the light guide plate 11 viewed from the side of the side surface 11b. The backlight chassis 35 is also omitted in this view. In the light guide plate 11, surfaces that are sandwiched between the top surface 11u and the bottom surface 11k are side surfaces 11a, 11b, 11r, and 11o.

As shown in FIGS. 1 and 2, the LED module MJ faces one side surface 11r in the light guide plate 11. The mounting surface 21u of the mounting substrate 21 and the light-emitting faces of the LEDs 22 mounted on the mounting surface 21u also face the side surface 11r. This way, light emitted from the LEDs 22 efficiently enter the light-receiving face 11r of the light guide plate 11. The total length of the mounting substrate 21 of the LED module MJ is about the same as the total length L11 of the light-receiving face 11r of the light guide plate 11. The total length L11 is the length of the light-receiving face 11r in the longitudinal direction, i.e., the direction X. The length of the mounting substrate 21 in the shorter side direction is about the same as the thickness T of the light guide plate 11. The thickness T is the length of the light-receiving face 11r in the shorter side direction.

On the light-receiving face 11r of the light guide plate 11, protrusions 12 are formed. As shown in FIGS. 1 and 2, protrusions 12A and 12B are formed near opposite ends of the light-receiving face 11r in the longitudinal direction, respectively. The protrusions 12 (12A, 12B) protrude in a direction (direction Y) that intersects with the light-receiving face 11r at a right angle.

The value of the protruding length of the protrusion 12A, i.e., protrusion length PL, is the same as that of the protruding length of the protrusion 12B, i.e., protrusion length PL. The protrusion length PL is greater than the height of the LEDs 22 (length from the light-emitting faces of the LEDs 22 to the bottom surfaces thereof). Parts of the surfaces of the protrusions 12A and 12B are continued to the top surface 11u, the bottom surface 11k, and the side surface 11a or 11b of the light guide plate 11, and are flush with these surfaces, which, in other words, form the same planes.

When at least two protrusions 12 are formed on the light-receiving face 11r, and when these protrusions are formed in the same manner as the protrusions 12A and 12B shown in FIGS. 1 and 2, for example, space SP is created between the protrusions 12A and 12B, and the LEDs 22 of the LED module MJ are placed in the space SP.

More specifically, the protrusion 12A is formed in the size that allows it to fit in a gap ILa between a side wall 35a of the backlight chassis 35 and the LED 22 that is closest to the side wall 35a. The protrusion 12B is formed in the size that allows it to fit in a gap ILb between a side wall 35b of the backlight chassis 35 and the LED 22 that is closest to the side wall 35b. The gap ILa is narrower than the gap ILb. Therefore, the protrusion 12A becomes a small block that fits in the gap ILa, which is relatively narrow, and the protrusion 12B becomes a large block that fits in the gap ILb, which is relatively wide.

The top end of the protrusion 12A makes contact with one of the two ends of the mounting surface 21u of the linear mounting substrate 21. The top end of the protrusion 12B makes contact with the other of the two ends of the mounting surface 21u of the linear mounting substrate 21. This way, the LEDs 22 on the mounting surface 21u are placed in the space SP sandwiched by the protrusions 12A and 12B. The length AL of a row of the plurality of LEDs 22 is shorter than the shortest distance SL between the protrusions 12A and 12B.

The protrusions 12 (12A, 12B) serve as a member to maintain the distance between the light-receiving face 11r of the light guide plate 11 and the mounting substrate 21, and hence the distance between the light-receiving face 11r and the light-emitting faces of the LEDs 22.

The shape difference between the protrusions 12A and 12B that are formed on the light-receiving face 11r, which is one of the side surfaces of the light guide plate 11, allows the protrusions 12 to serve as a recognition member that indicates whether the top surface 11u of the light guide plate 11 faces the front side or the rear side, i.e., the orientation of the light guide plate 11, for example. The light guide plate 11 is made of a transparent resin, and therefore, typically, it is difficult to distinguish the top surface 11u from the bottom surface 11k. The protrusions 12A and 12B can be effectively used for making a distinction by having mutually different shapes as shown in FIGS. 1 and 2 (that is, by forming several different types of protrusions 12 on the light-receiving face 11r).

More specifically, the protrusions 12A and 12B have the same thickness T and the same protrusion length PL, but a width Wa of the protrusion 12A and a width Wb of the protrusion 12B are different from each other. The widths Wa and Wb are the respective widths of the protrusions 12 along the longitudinal direction of the light-receiving face 11r of the light guide plate 11. Thus, the protrusions 12A and 12B have different shapes. In other words, although both of the protrusions 12A and 12B are formed in a cuboid shape, because the sizes thereof differ, the shapes thereof differ.

When the width of the protrusion 12A and the width of the protrusion 12B are viewed at the same time, such as when viewing the light guide plate 11 from the side of the top surface 11u or from the side of the bottom surface 11k, the difference between the protrusions 12A and 12B can be clearly seen. That is, it becomes possible to identify one of the two protrusions 12 as the protrusion 12A and the other as the protrusion 12B with ease.

As described above, when the difference between the protrusions 12A and 12B can be clearly seen, it becomes possible to recognize the orientation of the top surface 11u of the light guide plate 11 with ease. If the light guide plate 11 is configured such that the protrusion 12A comes to the left side and the protrusion 12B comes to the right side when the top surface 11u faces up, the bottom surface 11k faces down, and the light-receiving face 11r is located on the front side, a worker at the assembly process can recognize the orientation of the top surface 11u and the bottom surface 11k based on the positions of the protrusions 12A and 12B relative to each other.

When the orientation of the light guide plate 11 can be recognized, erroneous attachment of the light guide plate 11 becomes less likely to occur in the assembly process of the backlight unit 39. The reason thereof is explained below by using an example.

Figure 3A:
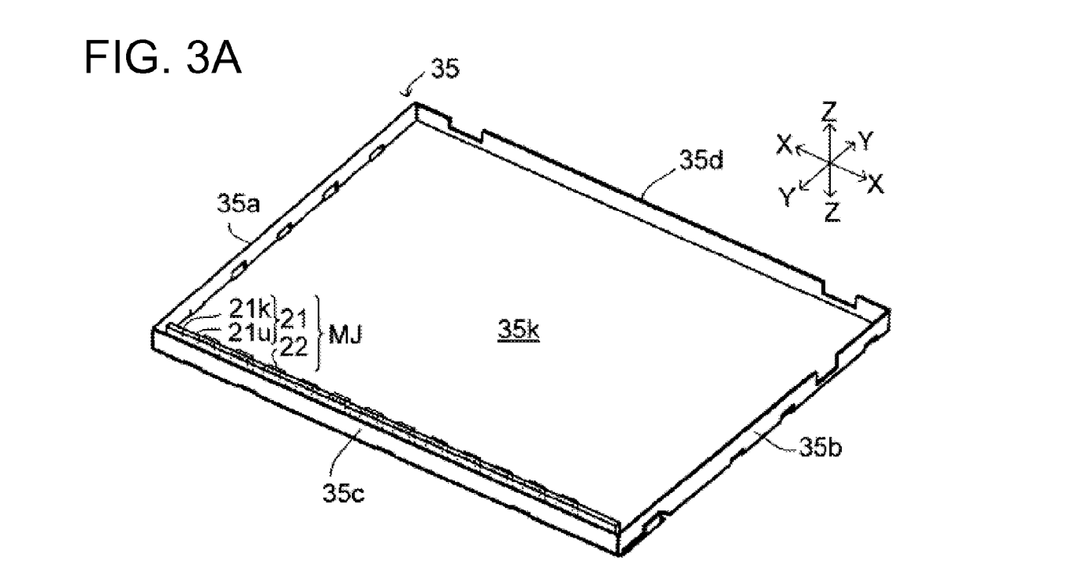
FIG. 3A is a perspective view of a backlight chassis and an LED module.
Figure 3B:
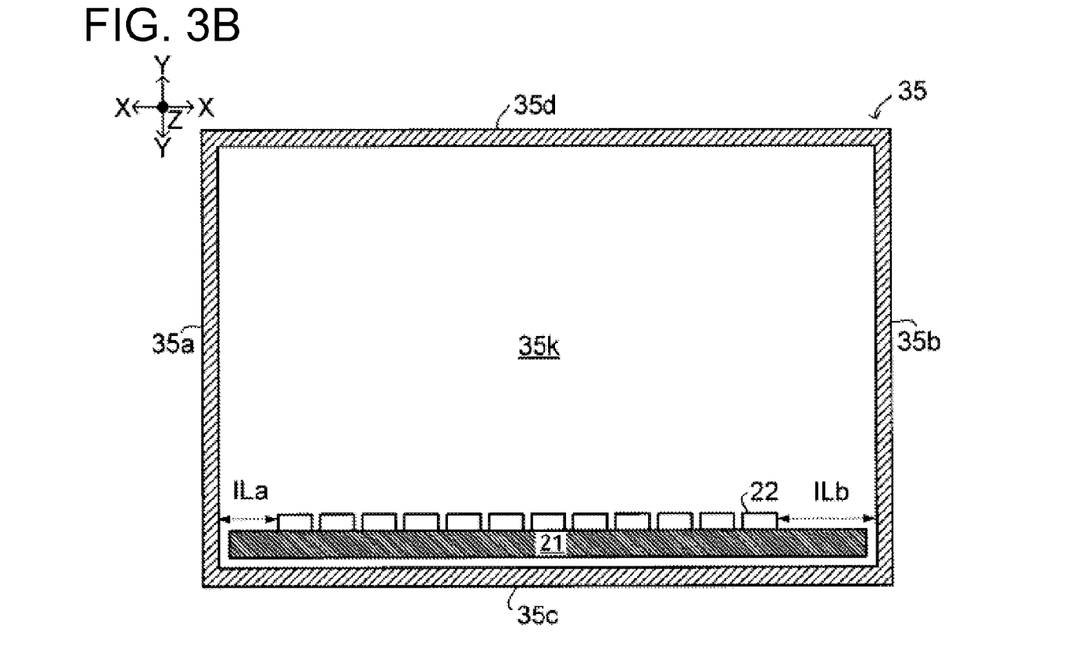
FIG. 3B is a plan view of the backlight chassis and the LED module.

As shown in a perspective view in FIG. 3A and a plan view in FIG. 3B, the LED module MJ is disposed on a side wall 35c of the backlight chassis 35. More specifically, the LED module MJ is affixed to a bottom 35k of the backlight chassis 35 such that the rear surface 21k of the mounting substrate 21 of the LED module MJ faces the inner side of the side wall 35c of the backlight chassis 35. There is no special limitation on the method of fixation. The total length of the mounting substrate 21 is shorter than the total length of the side wall 35c.

Inside the backlight chassis 35, the plurality of LEDs 22 in the LED module MJ are sandwiched by the side walls 35a and 35b that are extended along the direction Y, which intersects with the direction X, i.e., the longitudinal direction of the mounting substrate 21. The group of LEDs 22 is disposed so as to be off-centered in the space between the side wall 35a and the side wall 35b. In other words, the group of LEDs 22 is disposed in an off-centered manner in the longitudinal direction of the mounting substrate 21, instead of being centrally positioned. More specifically, the center of the group of LEDs 22 that are linearly arranged does not coincide with the center of the space between the side wall 35a and the side wall 35b.

With this configuration, the gap ILa between the side wall 35a and the LED 22 closest to the side wall 35a is made to differ from the gap ILb between the side wall 35b and the LED 22 closest to the side wall 35b. The light guide plate 11 is formed such that, when being housed in the backlight chassis 35, the protrusion 12A fits in the gap ILa and the protrusion 12B fits in the gap ILb.

As shown in FIG. 2, the backlight chassis 35, which houses the light guide plate 11 and the LED module MJ, has the side walls 35a and 35b along the protruding direction of the protrusions 12 of the housed light guide plate 11, i.e., the direction Y.

In the longitudinal direction of the light-receiving face 11r, i.e., the direction X, which intersects with the protruding direction, the respective shortest distances between the side walls 35a and 35b of the backlight chassis 35 and the two LEDs 22 respectively closest to the side walls 35a and 35b are defined as shortest distances IL (ILa, ILb). In the longitudinal direction of the light-receiving face 11r, the longest distances from the protrusions 12A and 12B to respective ends of the light-receiving face 11r, which are respectively closer to the protrusions, are defined as longest distances LD (widths Wa and Wb in FIG. 2). In the backlight 39, the longest distances LD are shorter than the shortest distances IL.

Figure 4A:
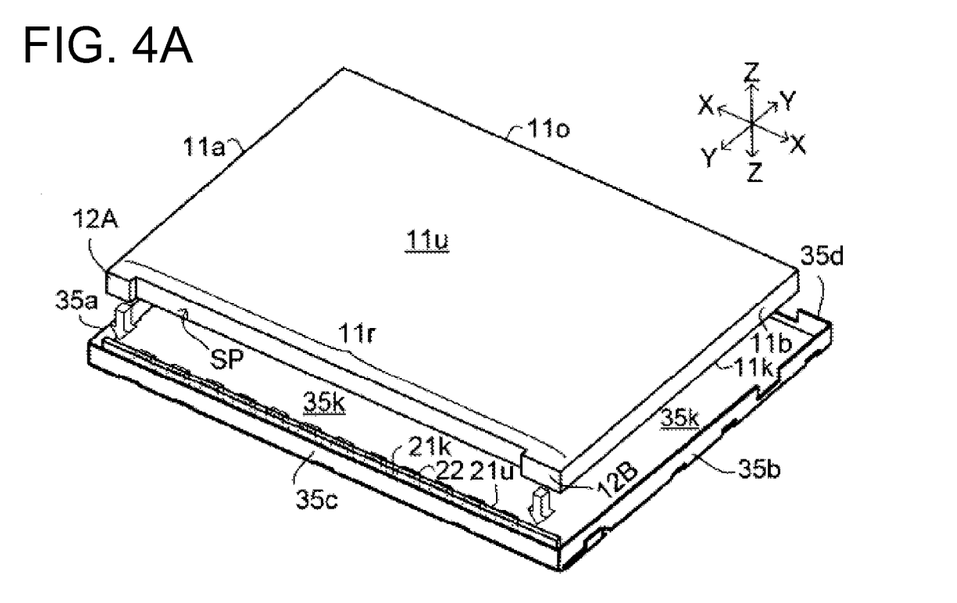
FIG. 4A is a perspective view of a backlight chassis, an LED module, and a light guide plate.
Figure 4B:
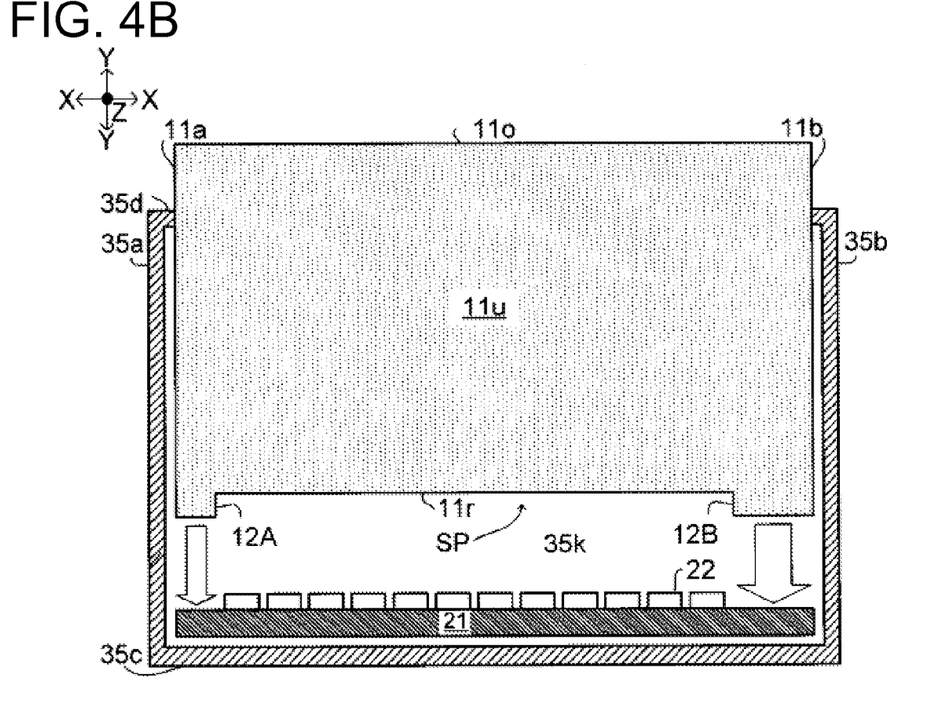
FIG. 4B is a plan view of the backlight chassis, the LED module, and the light guide plate.

As shown in FIGS. 4A and 4B, in the backlight 39 configured in the above-mentioned manner, when the light guide plate 11 is housed in the backlight chassis 35 such that the bottom surface 11k faces the bottom 35k, the protrusion 12A and the protrusion 12B respectively correspond to the gap ILa and the gap ILb, thereby allowing the protrusion 12A to fit in the gap ILa without touching the LED 22, and allowing the protrusion 12B to fit in the gap ILb without touching the LED 22. For convenience, the reflective sheet 31 is omitted from the figures. In FIG. 4B, the light guide plate 11 in a sliding motion is illustrated.

Figure 5A:
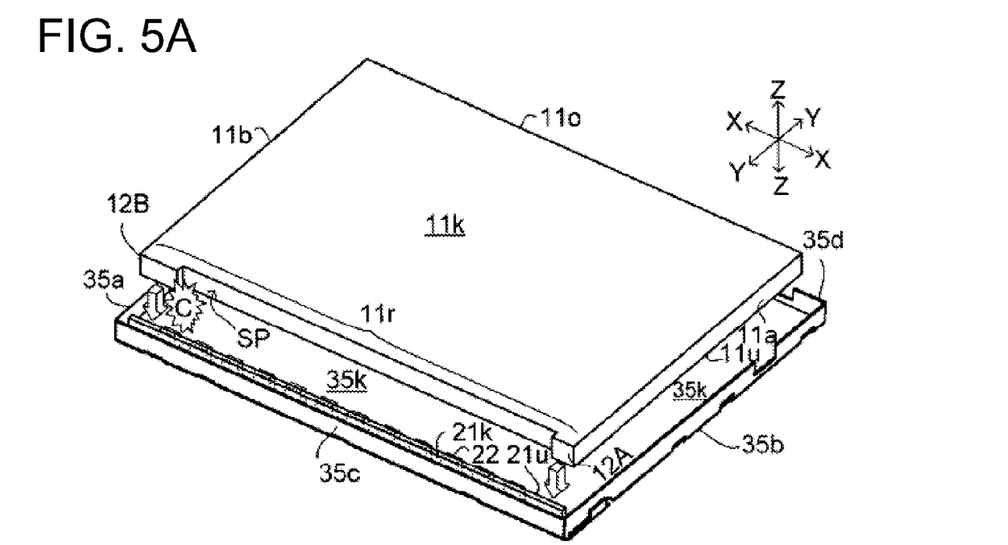
FIG. 5A is a perspective view of a backlight chassis, an LED module, and a light guide plate.
Figure 5B:
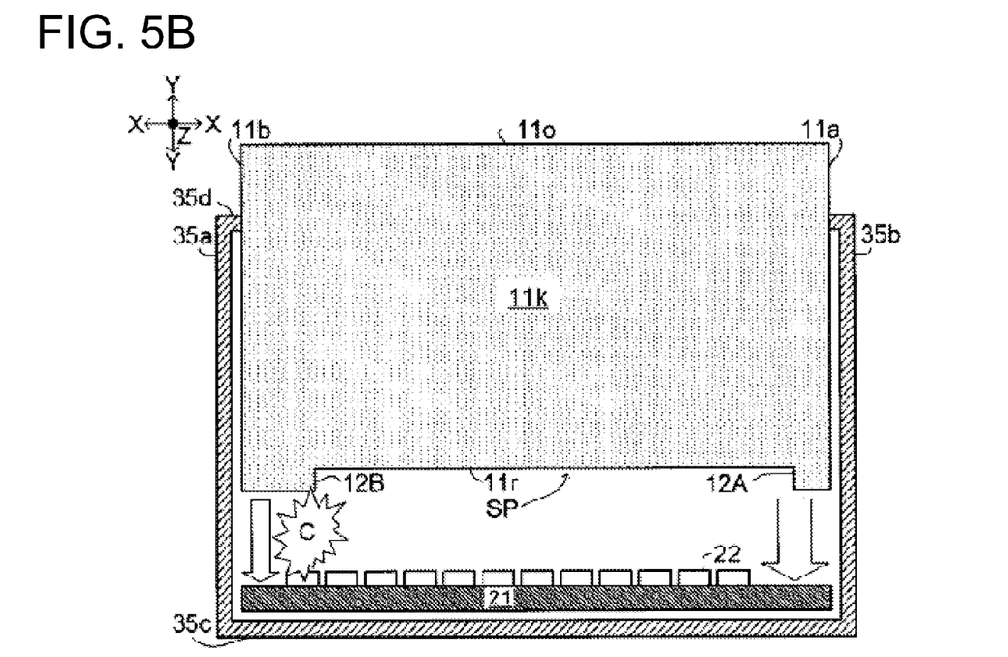
FIG. 5B is a plan view of the backlight chassis, the LED module, and the light guide plate.

On the other hand, as shown in FIGS. 5A and 5B, if the light guide plate 11 is housed in the backlight chassis 35 such that the top surface 11u faces the bottom 35k, although the protrusion 12A fits in the gap ILb, and does not touch the LED 22, the protrusion 12B does not fit in the gap ILa, and touches the LED 22. The reference character C in the figures represents the contact. For convenience, the reflective sheet 31 is omitted from the figures. In FIG. 5B, the light guide plate 11 in a sliding motion is illustrated.

When a worker at the assembly process assembles the backlight unit 39 while visually checking the protrusions 12A and 12B of the light guide plate 11 and the gaps ILa and ILb in the backlight chassis 35, if the worker at the assembly process places the protrusion 12A in the gap ILa so as not to touch the LED 22, and places the protrusion 12B in the gap ILb so as not to touch the LED 22, the bottom surface 11k of the light guide plate 11 is made to face the bottom 35k of the backlight chassis 35, and the top surface 11u faces the opening side of the backlight chassis 35. That is, it is possible to prevent the light guide plate 11 from being housed in the backlight chassis 35 upside down.

As described above, when the protrusions 12 have different shapes, the orientation of the light guide plate 11 can be recognized, which prevents the light guide plate 11 from being placed with a wrong side facing the backlight chassis 35, leading to a prevention of erroneous attachment of the light guide plate 11. Because the protrusions 12A and 12B are disposed so as to sandwich the plurality of LEDs 22 therebetween, and therefore are not likely to receive light from the LEDs 22, the occurrence of uneven light intensity of planar light caused by the light entering the protrusions 12 can be prevented. Also, the protrusions 12 are formed only on the light-receiving face 11r, which is one of the side surfaces of the light guide plate 11, and therefore, the outer shape of the backlight unit 39 equipped with the light guide plate 11 is made smaller than a backlight unit equipped with a light guide plate having protrusions on a plurality of side faces thereof, which are two side surfaces, for example.

Figure 6A:
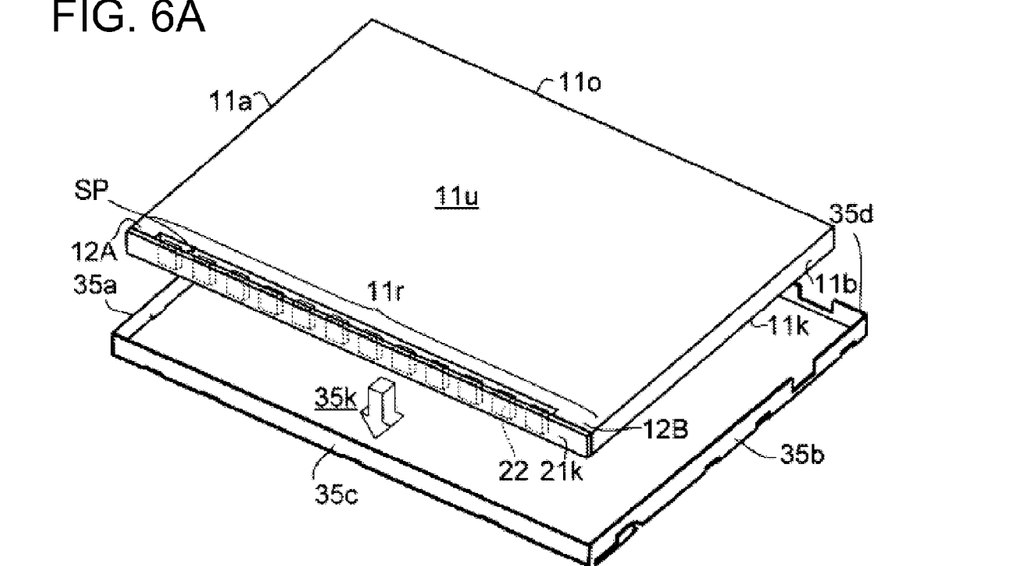
FIG. 6A is a perspective view of a backlight chassis, an LED module, and a light guide plate.

In the description above, the process of attaching the light guide plate 11 to the backlight chassis 35 after attaching the LED module MJ to the backlight chassis 35 was explained as an example, but the present invention is not limited to such. As shown in FIG. 6A, for example, the group of LEDs 22 of the LED module MJ may be placed in the space SP between the protrusions 12A and 12B of the light guide plate 11 first, and thereafter, the LED module MJ and the light guide plate 11 may be housed in the backlight chassis 35.

Figure 6B:
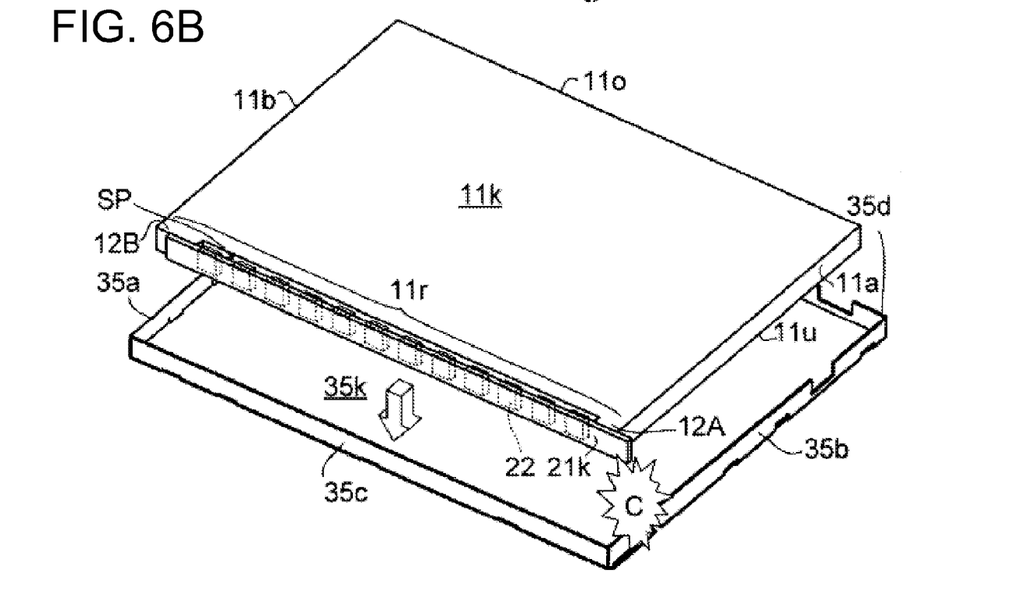
FIG. 6B is a perspective view of a backlight chassis, an LED module, and a light guide plate.

In such a process, as shown in FIG. 6B, if the length AL of the row of the group of LEDs 22 in the LED module MJ is shorter than the shortest distance SL between the protrusions 12A and 12B, it is possible that an end of the mounting surface 21u that makes contact with the protrusion 12A and an end of the mounting surface 21u that makes contact with the protrusion 12B become opposite to those in FIG. 6A. However, if the total length of the mounting substrate 21 is about the same as the total length of the light-receiving face 11r of the light guide plate 11 in the longitudinal direction, a part of the mounting substrate 21 does not face the light-receiving face 11r. As shown in FIG. 6B, for example, one of the two ends of the mounting substrate 21 does not face the light-receiving face 11r.

Because the part of the mounting substrate 21, which does not face the light-receiving face 11r, interferes with the side wall 35b of the backlight chassis 35, the backlight unit 39 cannot be assembled. If the mounting substrate 21 is attached to the backlight chassis 35 so as to fit therein, the light guide plate 11 interferes with the side wall 35a of the backlight chassis 35, which does not allow the backlight unit 39 to be assembled. That is, even in the process in which the light guide plate 11 is attached to the backlight chassis 35 after the LED module MJ is attached to the backlight chassis 35, erroneous attachment of the light guide plate 11 can be prevented.

Other Embodiments

The present invention is not limited to the above-mentioned embodiment, and various modifications can be made without departing from the scope of the invention.

The orientation of the light guide plate 11 shown in FIG. 2, for example, is recognized by the shape difference between the protrusions 12A and 12B. However, as shown in the trihedral figure (illustrated in the same manner as FIG. 2) in FIG. 7, the protrusions 12A and 12B may have the same shape. That is, the width Wa may equal the width Wb. However, in a manner similar to the light guide plate 11 shown in FIG. 2, the center SLc of the inter-protrusion space, which is the center of the shortest distance SL between the protrusions 12A and 12B at the opposite ends of the light-receiving face 11r in the longitudinal direction needs to be offset from the longitudinal center L11c of the light-receiving face, which is the center of the light-receiving face 11r in the longitudinal direction.

Figure 7:
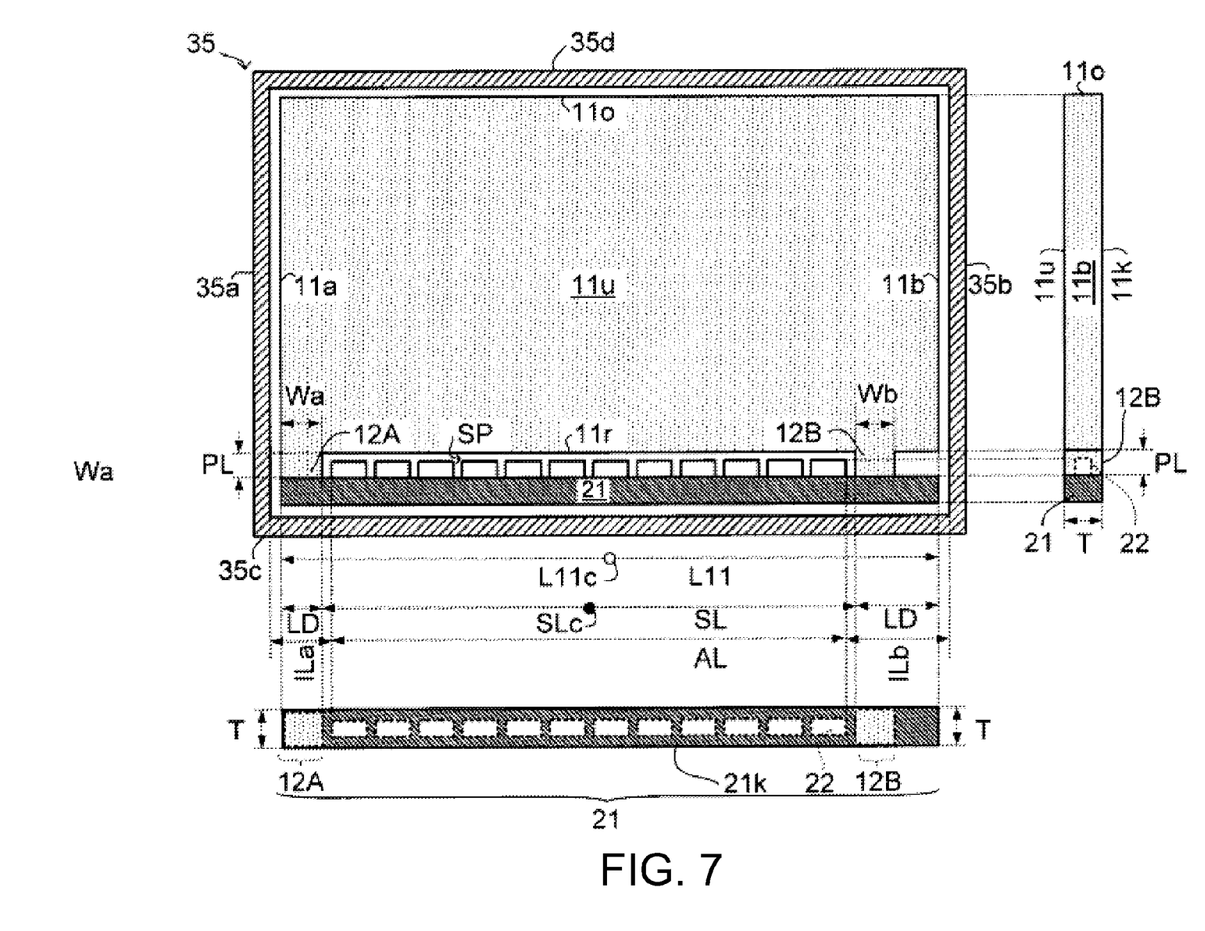
FIG. 7 is a trihedral figure of a backlight unit, which shows a plan view, a front view, and a side view.

As shown in FIG. 7, according to the above-mentioned configuration, the protrusions 12A and 12B having the same shape become asymmetrical, instead of symmetrical (line-symmetrical or point-symmetrical), with respect to the position of the longitudinal center L11c of the light-receiving face. As a result, the orientation of the light guide plate 11 can be recognized by visually checking the protrusions 12A and 12B, leading to the prevention of the erroneous attachment of the light guide plate 11.

Although the protrusions 12A and 12B have the same shape in FIG. 7, the protrusions 12A and 12B may have different shapes as shown in FIG. 2. That is, the protrusions 12A and 12B are not limited to the protrusions having the same shape shown in FIG. 7, but the protrusions 12A and 12B may be formed in a variety of shapes as shown in the trihedral figure (illustrated in the same manner as FIG. 2) in FIG. 8, and the shapes of the protrusions 12A and 12B may differ from each other.

Figure 8:
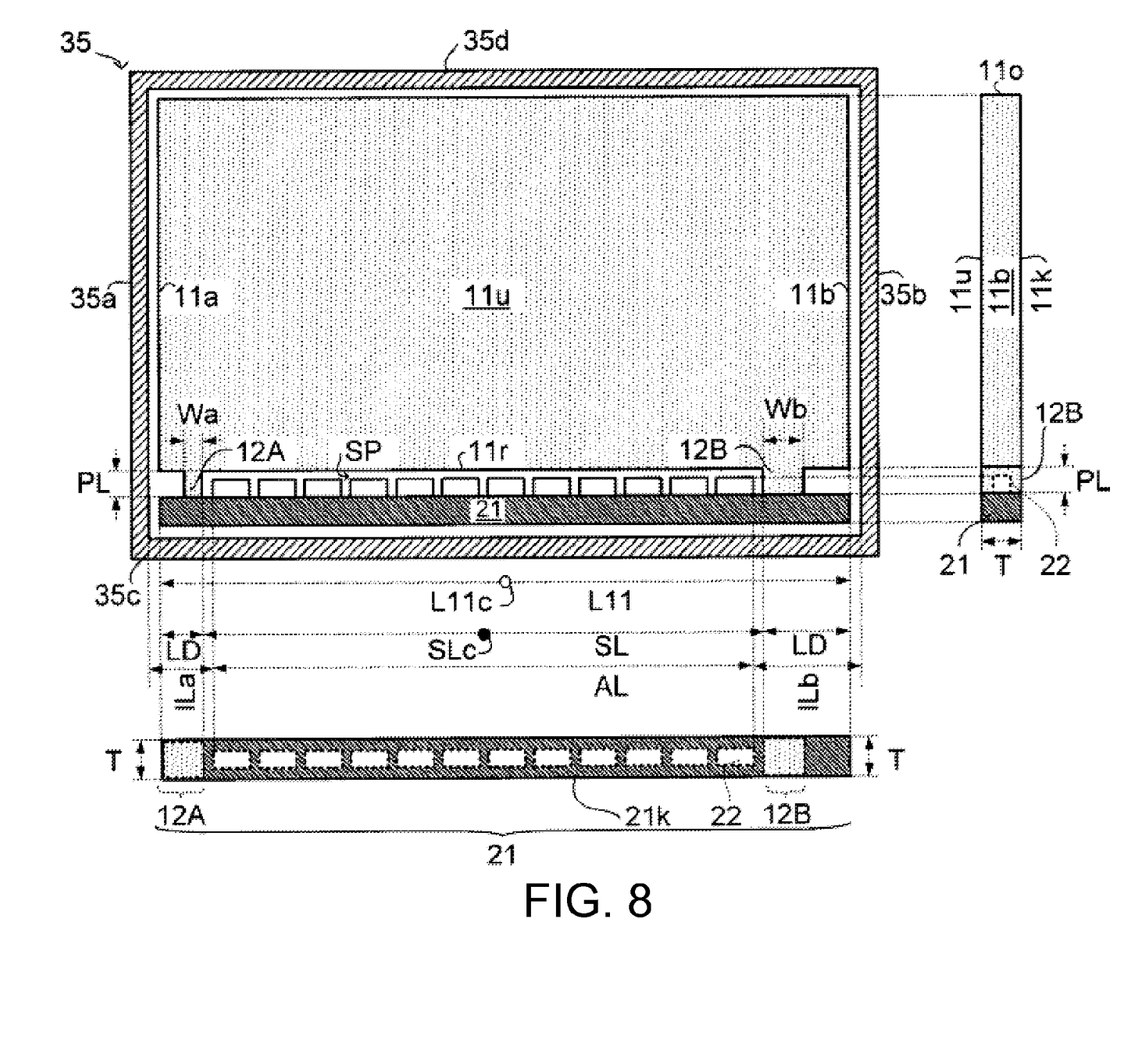
FIG. 8 is a trihedral figure of a backlight unit, which shows a plan view, a front view, and a side view.

In the case of the light guide plate 11 shown in FIG. 8, in a manner similar to FIG. 2, the protrusions 12A and 12B become asymmetrical with respect to the position of the longitudinal center L11c of the light-receiving face, instead of symmetrical, and therefore, the orientation of the light guide plate 11 is recognized. From another perspective, the orientation of the light guide plate 11 is recognized by the shape difference between the protrusions 12A and 12B (width Wa<width Wb, in the case of FIG. 8).

Figure 9A:
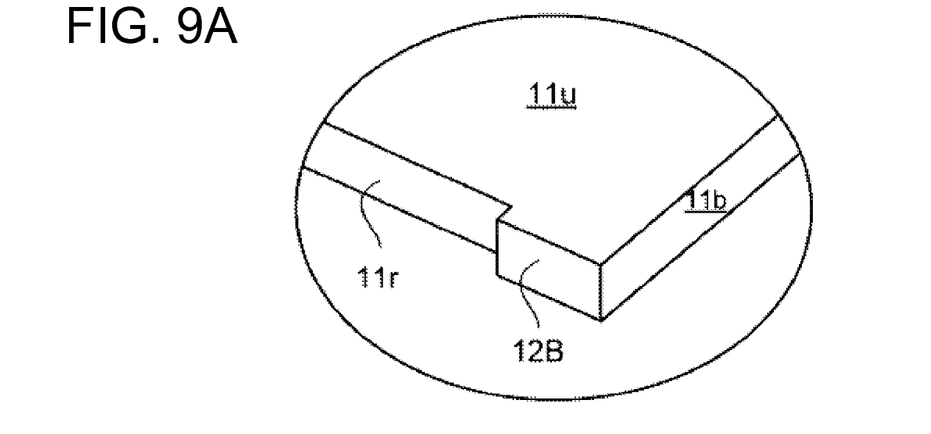
FIG. 9A is an enlarged perspective view of a protrusion.
Figure 9B:
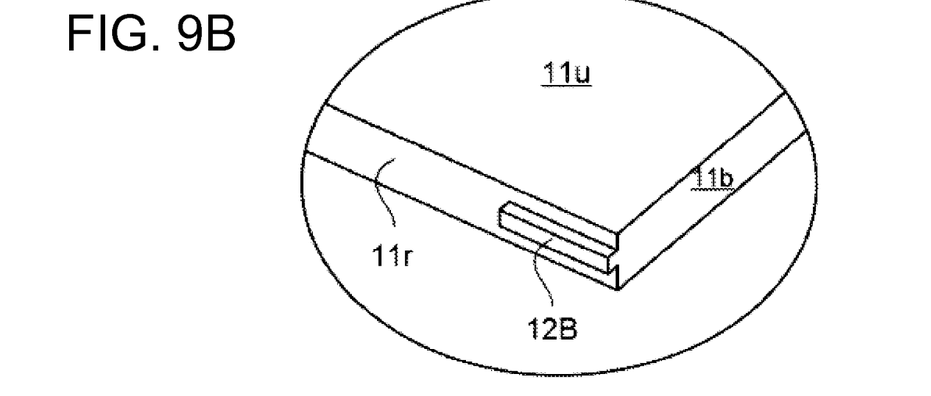
FIG. 9B is an enlarged perspective view of a protrusion.

As shown in FIG. 9A, which is an enlarged view of FIG. 2, parts of the surface of the protrusion 12B are flush with the top surface 11u, the bottom surface 11k, and the side surface 11b of the light guide plate 11. Parts of the surface of the protrusion 12A are flush with the top surface 11u, the bottom surface 11k, and the side surface 11a of the light guide plate 11. However, the protrusion 12B is not limited to the protrusion having parts of the surface being flush with the top surface 11u, the bottom surface 11k, and the side surface 11b of the light guide plate 11, and the protrusion 12B shown in FIG. 9B may also be employed, for example.

Figure 9C:
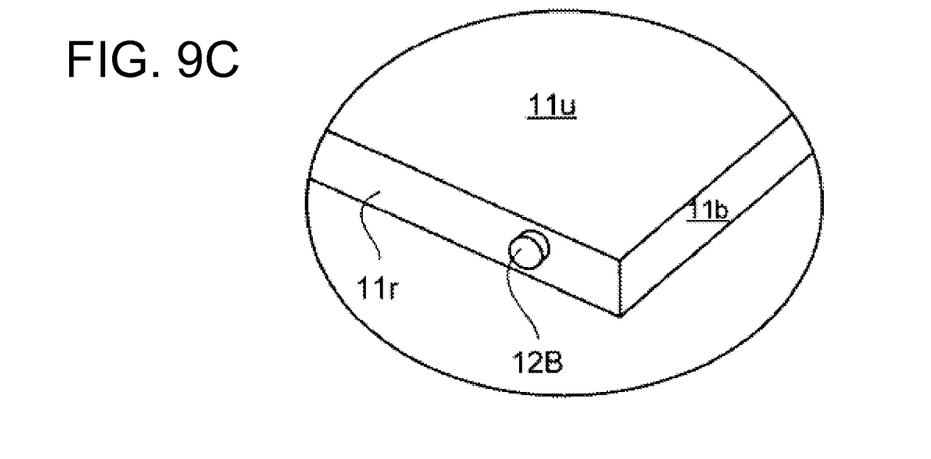
FIG. 9C is an enlarged perspective view of a protrusion.

That is, the protrusion 12B may be configured such that part of the surface is flush with the side surface 11b of the light guide plate 11, but not with the top surface 11u or the bottom surface 11k, thereby having steps in these locations. Alternatively, as shown in FIG. 9C, the protrusion 12B may have a columnar shape such as a circular column. That is, there is no special limitation on the shape of the protrusions 12 as long as they protrude from the light-receiving face 11r.

The orientation of the light guide plate 11 can be recognized with ease by a worker at the assembly process as long as the protrusions 12 are formed such that the types of the shape thereof can be recognized in a direction in which the top surface 11u or the bottom surface 11k of the light guide plate 11 is viewed, which is a viewing direction perpendicular to the top surface 11u or the bottom surface 11k, for example. When the protrusions 12 are formed so as to be recognized as being asymmetrical in the longitudinal direction of the light-receiving face 11r in the viewing direction of the top surface 11u or the bottom surface 11k of the light guide plate 11, the orientation of the light guide plate 11 can also be recognized with ease by a worker at the assembly process.

When the protrusions 12 are formed so as to include a portion that is flush with at least one surface of the three surfaces of the top surface 11u, the bottom surface 11k, and the side surface 11a (or the side surface 11b) of the light guide plate 11, the structure of a mold for forming the light guide plate 11 can be made relatively simple, which allows for a reduction in the mold cost.

In the descriptions above, an example in which the quantity of the protrusions 12 is two was explained, but the present invention is not limited to such. In other words, three or more protrusions 12 may be formed on the light-receiving face 11r. That is, there is no special limitation on the quantity of the protrusions 12 as long as at least one space SP, in which the group of LEDs 22 can be housed, is formed.

DESCRIPTIONS OF REFERENCE CHARACTERS 11 light guide plate
11r light-receiving face of light guide plate
11u top surface of light guide plate
11k bottom surface of light guide plate
11a side surface of light guide plate
11b side surface of light guide plate
11o side surface of light guide plate
12A protrusion of light guide plate
12B protrusion of light guide plate
MJ LED module (light-emitting module)
21 mounting substrate
21u mounting surface of mounting substrate
21k rear surface of mounting substrate
22 LED (light source, point light source, light-emitting element)
31 reflective sheet (optical member)
32 diffusion plate (optical member)
33 prism sheet (optical member)
34 lens sheet (optical member)
35 backlight chassis (chassis)
35a to 35d side walls of backlight chassis
35k bottom of backlight chassis
39 backlight unit (illumination device)
49 liquid crystal display panel (display panel)
59 liquid crystal display device (display device)

The invention claimed is:

1. A light guide plate that receives light at a light-receiving face thereof and that emits received light through a top surface thereof, comprising at least two protrusions formed on the light-receiving face,
wherein the protrusions serve as a recognition member that helps an orientation of the top surface to be recognized.

2. The light guide plate according to claim 1, wherein the two protrusions have mutually different shapes.

3. The light guide plate according to claim 1, wherein the two protrusions are formed at two ends of the light-receiving face in a longitudinal direction, and a center of a shortest distance between the two protrusions is offset from a center of the light-receiving face in the longitudinal direction.

4. The light guide plate according to claim 3, wherein the two protrusions have a same shape, or have mutually different shapes.

5. The light guide plate according to claim 1, wherein the two protrusions have a portion that is flush with one surface of the top surface, a bottom surface that is a surface opposite to the top surface, and a side surface between the top surface and the bottom surface.

6. An illumination device, comprising the light guide plate according to claim 1, a light source that supplies light to the light-receiving face of the light guide plate, and a chassis that houses the light guide plate and the light source.

7. The illumination device according to claim 6, wherein the chassis has a side wall along a protruding direction of the protrusions in the light guide plate,
wherein, when a shortest distance between the side wall and the light source closest thereto is defined as IL, and a longest distance between the protrusion and an end of the light-receiving face closest thereto is defined as LD in a longitudinal direction of the light-receiving face, which is a direction intersecting with the protruding direction,
the longest distance LD is shorter than the shortest distance IL.

8. A display device, comprising the illumination device according to claim 6 and a display panel receiving light from the illumination device.

* * * * *